United States Patent [19]

Yamamoto et al.

[11] Patent Number: 5,418,029
[45] Date of Patent: May 23, 1995

[54] INFORMATION RECORDING MEDIUM AND METHOD

[75] Inventors: Ryoichi Yamamoto; Shizuo Umemura; Kazuo Sanada, all of Kanagawa, Japan

[73] Assignee: Fuji Photo Film Co., Ltd., Kanagawa, Japan

[21] Appl. No.: 10,307

[22] Filed: Jan. 28, 1993

[30] Foreign Application Priority Data

Jan. 28, 1992 [JP] Japan .................................. 4-012940
Sep. 14, 1992 [JP] Japan .................................. 4-244370

[51] Int. Cl.⁶ ............................................. B32B 3/00
[52] U.S. Cl. ........................................ 428/64; 428/65; 428/913; 346/135.1; 369/288; 347/264
[58] Field of Search ................... 428/64, 65, 913; 346/762, 135.1; 369/288; 430/270, 945

[56] References Cited

U.S. PATENT DOCUMENTS 4,731,754 3/1988 Ogden et al. .................. 365/121

FOREIGN PATENT DOCUMENTS 52-123205 10/1977 Japan .
57-27447 2/1982 Japan .
63-193349 8/1988 Japan .

OTHER PUBLICATIONS

"Ferroelectric Substance Film Integrating Technology" Science Forum, pp. 261–274.

*Primary Examiner*—Patrick J. Ryan
*Assistant Examiner*—Elizabeth Evans
*Attorney, Agent, or Firm*—Sughrue, Mion, Zinn, Macpeak & Seas; Richard C. Turner; Raymond H. J. Powell, Jr.

[57] ABSTRACT

An information recording medium comprises a semiconductor layer and a layer of a ferroelectric substance overlaid on the semiconductor layer, information being recorded by means of directions of polarization of the ferroelectric substance. The ferroelectric substance is an organic ferroelectric substance, such that recorded information may not be lost during its reproduction and a sufficiently high level of a reproduced signal may be obtained.

7 Claims, 10 Drawing Sheets

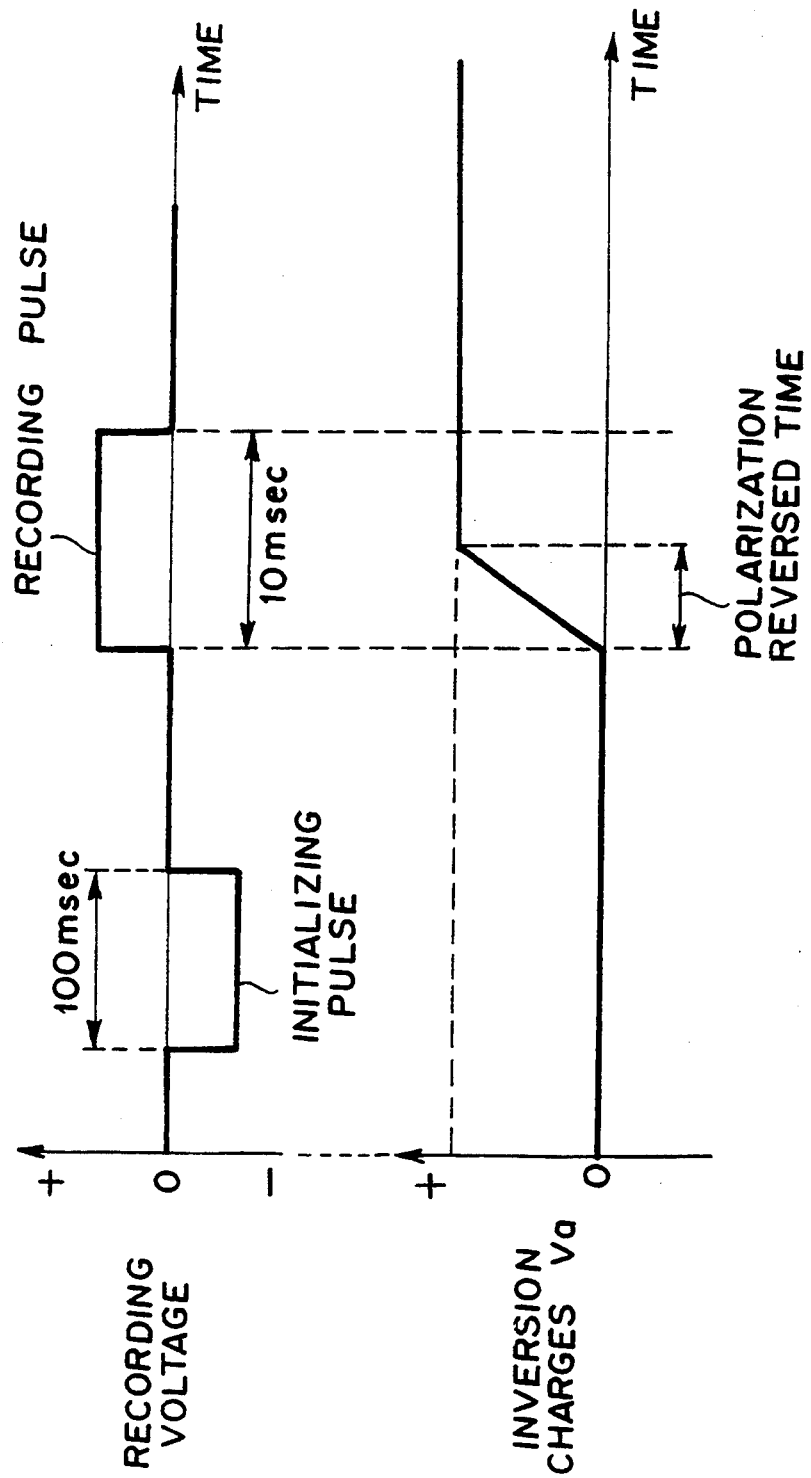

F I G. 15
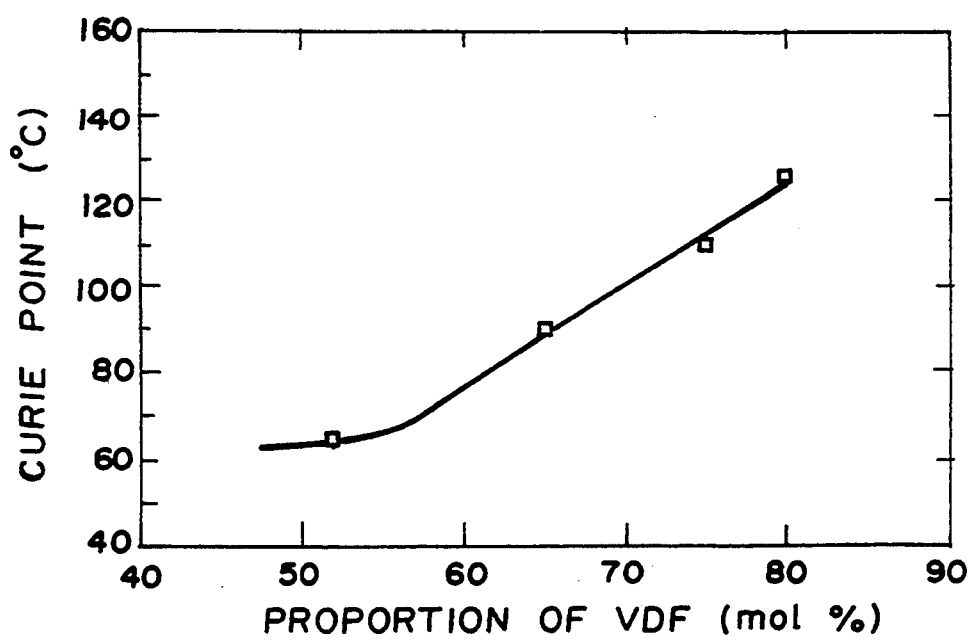

INFORMATION RECORDING MEDIUM AND METHOD

BACKGROUND OF THE INVENTION

1. Field of the Invention

This invention relates to an information recording medium. This invention particularly relates to an information recording medium, which is provided with a layer of a ferroelectric substance and on which information is recorded by means of directions of polarization of the ferroelectric substance. This invention also relates to a method for recording information on the information recording medium.

2. Description of the Prior Art

As information recording media, on which various kinds of information, such as image signals and audio signals, are recorded or which are used as signal memories for computers, magnetic recording media, magneto-optical recording media, or the like, have heretofore been used widely.

Also, an information recording medium, on which the information can be recorded and erased, from which the information can be reproduced, and on which the information can be recorded at a high density, has been proposed in, for example, Japanese Unexamined Patent Publication No. 57(1982)-27447. The proposed information recording medium comprises a semiconductor layer and a layer of a ferroelectric substance overlaid on the semiconductor layer and records the information by means of directions of polarization of the ferroelectric substance. Recording of the information on the proposed information recording medium is carried out by moving an electroconductive head on the ferroelectric substance layer, and at the same time applying a voltage to the ferroelectric substance layer such that only predetermined portions of the ferroelectric substance layer may be selectively polarized in a predetermined direction. When the information is to be reproduced from the information recording medium, a change in the electrostatic capacity of the recording medium due to depletion layers, which are formed in the semiconductor layer by the polarization of the ferroelectric substance, is detected by an electroconductive head.

As the electroconductive head for reproduction, theoretically, a reproducing head, which is employed in a video disk system referred to as the VHD system, can be used. Specifically, with the video disk for the VHD system, the depletion layers described above are not formed, but a change in the electrostatic capacity is obtained from the presence or absence of pits. Therefore, the head for reproducing the recorded information is constituted so as to detect a change in the electrostatic capacity, which change occurs in accordance with the recorded information.

It is considered that a coercive field Ec serves as one of indexes for the stability of the information, which has been recorded by means of the directions of polarization of the ferroelectric substance. The stability of the information recorded on the information recording medium will hereinbelow be studied from the point of view of the coercive field Ec.

As for the conventional information recording medium disclosed in Japanese Unexamined Patent Publication No. 57(1982)-27447, the material which is considered for use as the ferroelectric substance is only lead titanate, which is an inorganic material. The coercive field Ec of the inorganic ferroelectric substance having a perovskite structure, such as lead titanate, is approximately on the order of several megavolts/m. In cases where the inorganic ferroelectric substance is used to record information at a high density, it is necessary for the thickness of the layer of the ferroelectric substance to be reduced to a value approximately equal to the recording spot length, e.g., to approximately 0.1 μm. In such cases, the coercive field Ec can be converted to a voltage on the order of 0.1 V. Specifically, if a voltage higher than this order is applied to the ferroelectric substance layer, the recorded signal will disappear.

When a signal is reproduced from the information recording medium, in general, if the amplitude of a radio-frequency (RF) voltage, which is applied to the resonance circuit containing the information recording medium via the electroconductive head during the detection of the electrostatic capacity of the information recording medium, is lower than 1V, a reproduced signal will be obtained which has a markedly low S/N ratio and cannot be utilized practically. This is because the output power of the reproduced signal is proportional to the amplitude of the RF voltage. By way of example, in ordinary electrostatic capacity types of video disk systems, the amplitude of the RF voltage applied to the disk is set at approximately 4 V with the S/N ratio of the reproduced signal being taken into consideration.

As described above, even if the amplitude of the RF voltage applied to the information recording medium is set at the minimum value, i.e., approximately 1 V, such that the S/N ratio of the reproduced signal may not become markedly low, the setting value is much larger than 0.1 V, and therefore the information recorded on the information recording medium will be lost.

For the purposes of manufacturing an apparatus for reproducing the recorded information from the information recording medium of this type, it is desirable that the electroconductive head conventionally employed in the VHD system is utilized directly. However, with the conventional information recording medium in which depletion layers are formed, a degree of modulation ΔC, i.e., the change in the electrostatic capacity caused to occur by the presence or absence of the depletion layers, is small, and therefore the conventional reproducing head cannot be utilized directly.

Also, the system for recording the information on the information recording medium by applying a voltage to the ferroelectric substance layer from the exterior in the manner described above, the problems occur in that, if the recording voltage is excessively high, the ferroelectric substance layer will suffer from dielectric breakdown, and the information recording medium will break. The intensity of the electric field, at which dielectric breakdown occurs, varies for different kinds of materials, structures, conditions, and the like, and is ordinarily approximately 1 MV/cm. The thickness of a recording layer of the information recording medium in accordance with the present invention is approximately 1 μm or less. Therefore, in order for the information recording medium to be prevented from breaking due to dielectric breakdown, it is desirable that the voltage applied from the exterior during the recording step is kept at 100 V or less. However, such a recording method has not heretofore been developed.

SUMMARY OF THE INVENTION

The primary object of the present invention is to provide an information recording medium, on which information is recorded at a high density, from which a reproduced signal having a sufficiently high level of output power is obtained, and on which the recorded information is not caused to disappear by a reproducing operation.

Another object of the present invention is to provide an information recording medium, which accomplishes the aforesaid primary object of the present invention and on which the information can be recorded quickly.

A further object of the present invention is to provide an information recording medium, which accomplishes the aforesaid primary object of the present invention, and which is free of the risk that the recorded information is caused to disappear by ambient temperatures.

A still further object of the present invention is to provide an information recording medium, which accomplishes the aforesaid primary object of the present invention, and which is easy to manufacture.

Another object of the present invention is to provide an information recording medium, from which the recorded information is reproduced by directly utilizing an electroconductive head employed in a VHD system.

A further object of the present invention is to provide an information recording medium, on which information is recorded such that dielectric breakdown of a ferroelectric substance layer may not occur.

A still further object of the present invention is to provide an information recording method, wherein information is recorded such that dielectric breakdown of a ferroelectric substance layer may not occur.

Another object of the present invention is to provide an information recording method, wherein the recording voltage is kept low and a high level of reproduced signal output power is obtained.

The present invention provides a first information recording medium comprising a semiconductor layer and a layer of a ferroelectric substance overlaid on the semiconductor layer, information being recorded by means of directions of polarization of the ferroelectric substance, wherein the ferroelectric substance is an organic ferroelectric substance.

The organic ferroelectric substance should preferably be a vinylidene fluoride (VDF) polymer, a copolymer containing vinylidene fluoride, an odd-numbered Nylon, a vinylidene cyanide polymer, or a copolymer containing vinylidene cyanide. The organic ferroelectric substance should more preferably be a copolymer containing vinylidene fluoride, such as a copolymer of vinylidene fluoride with trifluoro ethylene (TrFE) or tetrafluoro ethylene (TFE). The proportion of vinylidene fluoride in such a copolymer should preferably fall within the range of 50 to 80 mol %. As the odd-numbered Nylon, Nylon #11 and Nylon #7 are preferable.

As the semiconductor layer, a substrate constituted of a semiconductor may be used directly. Alternatively, a polymer, glass, or a metal, which has been provided with guide grooves, guide pits, pits representing sector information or the like, may be used as a substrate, and a semiconductor layer may be overlaid on the substrate. As the semiconductor, it is possible to use Si, Ge, a III-V Group compound semiconductor, such as GaAs, a II-VI Group compound semiconductor, such as ZnSe, or an organic semiconductor, such as polypyrrole or polythiophene. These semiconductors may be single crystalline, polycrystalline, or amorphous. Also, the resistivity of the semiconductor should preferably fall within the range of approximately 0.01 $\Omega$cm to 1,000 $\Omega$cm, and should more preferably fall within the range of approximately 0.1 $\Omega$cm to 100 $\Omega$cm.

The semiconductor should preferably be constituted of impurity-doped, N-type or P-type silicon. The impurity concentration in silicon should fall within the range of approximately $10^{19}$ to $10^{24}$m$^{-3}$, and should preferably fall within the range of approximately $10^{20}$ to $10^{23}$m$^{-3}$.

The present invention also provides a second information recording medium wherein an insulating layer constituted of SiO$_2$ intervenes between the semiconductor layer and the ferroelectric substance layer, the ferroelectric substance layer is constituted of a material selected from the group consisting of a vinylidene fluoride polymer and a copolymer containing vinylidene fluoride, and a thickness x of the ferroelectric substance layer and a thickness y of, the insulating layer fall within a region on a coordinate system, in which the thickness x is plotted on a horizontal axis and the thickness y is plotted on a vertical axis, the region extending on a straight line, which connects a point having coordinates (x=0.4 $\mu$m, y=25 nm) and a point having coordinates (x=0.1 $\mu$m, y=40 nm), on an extension of the straight line, and under the straight line and the extension of the straight line, and satisfying the conditions $0 < x \leq 0.4$ $\mu$m and $y \geq 20$ nm.

The present invention further provides a first information recording method comprising using the second information recording medium described above, and causing the ferroelectric substance layer to become polarized at a recording voltage of not larger than 100 V.

The present invention still further provides a third information recording medium, wherein the first information recording medium in accordance with the present invention is modified such that the ferroelectric substance layer is constituted of a vinylidene fluoride-trifluoro ethylene copolymer, in which the proportion of vinylidene fluoride falls within the range of 50 to 65 mol %.

The present invention also provides a fourth information recording medium, wherein the first information recording medium in accordance with the present invention is modified such that the ferroelectric substance layer is constituted of a vinylidene fluoride-trifluoro ethylene copolymer, in which the proportion of vinylidene fluoride falls within the range of 65 to 80 mol %.

The present invention also provides a fifth information recording medium, wherein the first information recording medium in accordance with the present invention is modified such that the ferroelectric substance layer is constituted of a material selected from the group consisting of a vinylidene fluoride polymer and a copolymer containing vinylidene fluoride, and the semiconductor layer and the ferroelectric substance layer are in direct contact with each other without any insulating layer intervening therebetween. The term "a semiconductor layer and a ferroelectric substance layer are in direct contact with each other without any insulating layer intervening therebetween" embraces the state in which the surface of the semiconductor layer is covered by a naturally formed oxide film and the ferroelectric substance layer is overlaid on the oxide film.

The present invention further provides a second information recording method comprising using the fifth information recording medium described above, and duration time of recording voltage continuously applied to an identical spot of the medium is not longer than 0.1 second.

The organic ferroelectric substance undergoes polarization and inversion such that its molecular chain may be twisted. Therefore, ordinarily, the coercive field Ec of the organic ferroelectric substance falls within the range of several tens of megavolts/m to approximately 100 MV/m, and is markedly larger than the coercive fields Ec of inorganic ferroelectric substances. Even if the layer thickness of the organic ferroelectric substance is reduced to approximately 0.1 $\mu$m, an inversion potential of approximately 10 V will be required. The value of 10 V is sufficiently larger than the minimum value of 1 V which is necessary from the point of view of the S/N ratio of the reproduced signal. Accordingly, with the information recording medium utilizing the organic ferroelectric substance in accordance with the present invention, even if signal reproduction is carried out by applying an RF voltage of approximately 4 V as in ordinary procedures, the information recorded on the information recording medium will not be lost. Also, the S/N ratio of the reproduced signal can be increased even further by setting the RF voltage at a value larger than 4 V.

Also, with the second information recording medium in accordance with the present invention, wherein the insulating layer intervenes between the semiconductor layer and the ferroelectric substance layer, problems with regard to carrier injection into the ferroelectric substance, and the like, can be eliminated.

Further, with the second information recording medium in accordance with the present invention, the insulating layer is constituted of $SiO_2$, and the ferroelectric substance layer is constituted of a material selected from the group consisting of a vinylidene fluoride polymer and a copolymer containing vinylidene fluoride. Also, the thicknesses of the ferroelectric substance layer and the insulating layer are set such that they may fall within the specific region. Therefore, a minimum level of the degree of modulation $\Delta C$ can be obtained which is necessary when a conventional electroconductive head for the VHD system is directly used for the reproduction of information. Also, the recording voltage can be set at a value not larger than 100 V, at which there is no risk of dielectric breakdown of the ferroelectric substance layer. The reason for this will be described hereinbelow.

There is the tendency for the voltage required for the recording step to become higher as the insulating layer constituted of $SiO_2$ is thicker. Also, experiments carried out by the inventors revealed that the recording voltage can be set at a value not larger than 100 V when the thickness y of the insulating layer constituted of $SiO_2$ is as thin as the value falling on the aforesaid straight line or under the straight line.

If the insulating layer constituted of $SiO_2$ is markedly thin, carrier injection into the ferroelectric substance layer will occur. As a result, the degree of modulation $\Delta C$, which will increase when the recording voltage is increased, shifts to the decreasing tendency when the recording voltage increases to a certain level.

It is considered that, for the purposes of enabling the electroconductive head for the VHD system to be used for the reproduction of information, it is ordinarily necessary for the recording medium to yield a change in the electrostatic capacity of $\Delta C = 1fF/\mu m^2 = 0.1$ $\mu F/cm^2$. However, if the degree of modulation $\Delta C$ becomes lower as the recording voltage increases, a degree of modulation of $\Delta C = 0.1$ $\mu F/cm^2$ or higher cannot be obtained. The experiments carried out by the inventors revealed that, when the thickness y of the insulating layer constituted of $SiO_2$ is not smaller than 20 nm, the phenomenon of the degree of modulation $\Delta C$ becoming low in accordance with an increase in the recording voltage can be eliminated almost completely.

It was also revealed that there is the tendency for the degree of modulation $\Delta C$ to become gradually lower as the ferroelectric substance layer constituted of a vinylidene fluoride polymer or a copolymer containing vinylidene fluoride becomes thicker. Investigation of the relationship between the thickness x of the ferroelectric substance layer and the degree of modulation $\Delta C$ revealed that the degree of modulation $\Delta C$ of 0.1 $\mu F/cm^2$ or higher can be obtained when the thickness x is not larger than 0.4 $\mu$m.

As described above, the electroconductive head for the VHD system can be utilized for the reproduction of information and the recording voltage can be set at a value not larger than 100 V during the information recording step in cases where the thickness x of the ferroelectric substance layer, which is constituted of a vinylidene fluoride polymer or a copolymer containing vinylidene fluoride, and the thickness y of the insulating layer, which is constituted of $SiO_2$, fall within the specific region on the coordinate system, in which the thickness x is plotted on the horizontal axis and the thickness y is plotted on the vertical axis. The region extends on the straight line, which connects the point having the coordinates (x=0.4 $\mu$m, y=25 nm) and the point having the coordinates (x=0.1 $\mu$m, y=40 nm), on the extension of the straight line, and under the straight line and the extension of the straight line. Also, the region satisfies the conditions $0 < x \leq 0.4$ $\mu$m and $y \geq 20$ nm.

Therefore, with the second information recording medium in accordance with the present invention, as in the first information recording method in accordance with the present invention, normal recording can be carried out even if the recording voltage is set at a value not larger than 100 V. When the recording voltage is set at a value not larger than 100 V, the information recording step can be carried out such that the information recording medium may not break due to dielectric breakdown.

With the third information recording medium in accordance with the present invention, the same effects as those of the first information recording medium in accordance with the present invention can be obtained. In addition, the effects can be obtained in that the information can be recorded quickly. The reasons why such effects can be obtained will be described in detail later.

With the fourth information recording medium in accordance with the present invention, the same effects as those of the first information recording medium in accordance with the present invention can be obtained. In addition, the effects can be obtained in that the recorded information can be prevented from disappearing due to ambient temperatures. The reasons why such effects can be obtained will be described in detail later.

With the fifth information recording medium in accordance with the present invention, the same effects as those of the first information recording medium in accordance with the present invention can be obtained. In addition, the effects can be obtained in that the fifth information recording medium in accordance with the present invention has no insulating layer between the semiconductor layer and the ferroelectric substance layer, and therefore can be manufactured more easily than an information recording medium having an insulating layer between the semiconductor layer and the ferroelectric substance layer.

Heretofore, it has been known that, in cases where no insulating layer is provided between a semiconductor layer and a ferroelectric substance layer, carrier injection occurs from the semiconductor layer to the ferroelectric substance layer, and the effects of the polarization of the ferroelectric substance are thereby canceled. As a result, the degree of modulation (the change in the electrostatic capacity) $\Delta C$ shows a peak and thereafter becomes low. Such phenomena are described in, for example, "Kyo-Yudentai Hakumaku Shusekika Gijutsu" (Ferroelectric Substance Film Integrating Technology), Science Forum, p. 261. If the degree of modulation $\Delta C$ is low, a high reproduction output power cannot be obtained. However, it was found that, with the second information recording method in accordance with the present invention, even if the information recording medium having no such insulating layer is used, a high reproduction output power can be obtained.

As described above, with the second information recording method in accordance with the present invention, the fifth information recording medium described above is used, and duration time of recording voltage continuously applied to an identical spot of the medium is not longer than 0.1 second. Research carried out by the inventors revealed that, if the recording voltage application time is as short as the specified period of time, the effects of the carrier injection disappear, and a high degree of modulation $\Delta C$ can be obtained. If the degree of modulation $\Delta C$ becomes high, a large reproduction output power can be obtained. Also, it was revealed that, if no insulating layer is provided, the recording voltage can be kept small.

BRIEF DESCRIPTION OF THE DRAWINGS

FIG. 11 is a graph showing the wave form of a recording voltage and the wave form of inversion electric charges of the rating sample in the apparatus of FIG. 10, FIG. 15 is a graph showing the relationship between the proportion of VDF in a VDF/TrFE copolymer and the Curie temperature.

DESCRIPTION OF THE PREFERRED EMBODIMENTS

The present invention will hereinbelow be described in further detail with reference to the accompanying drawings.

Figure 1:
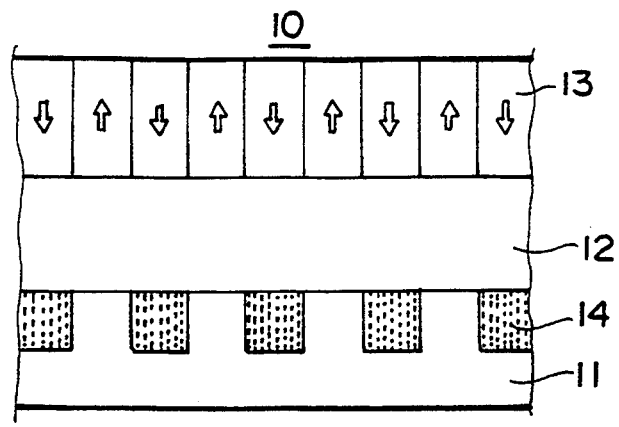
FIG. 1 is a schematic sectional side view showing a first embodiment of the information recording medium in accordance with the present invention.

FIG. 1 is an explanatory sectional side view showing an information recording medium 10 as a first embodiment of the present invention. The information recording medium 10 comprises a semiconductor layer 11, an insulating layer 12 overlaid on the semiconductor layer 11, and an organic ferroelectric substance layer 13 overlaid on the insulating layer 12. In this embodiment, a semiconductor substrate is directly used as the semiconductor layer 11. As the substrate, a P-type silicon wafer having a resistivity of 10 $\Omega$cm and an impurity concentration of $5 \times 10^{21} m^{-3}$. The insulating layer 12 is constituted of a layer of silicon oxide ($SiO_2$), which has a thickness of 50 nm and is overlaid on the silicon wafer with a thermal oxidation process. The organic ferroelectric substance layer 13 overlaid on the insulating layer 12 is constituted of a copolymer of vinylidene fluoride (VDF) with trifluoro ethylene (TrFE) (proportion of vinylidene fluoride: 65 mol %).

By way of example, the organic ferroelectric substance layer 13 is formed in the manner described below. First, the aforesaid copolymer (hereinafter referred to as the VDF/TrFE copolymer) is dissolved in a proportion of 3 wt % in methyl ethyl ketone (MEK). The resulting solution is then applied onto the silicon wafer by using a commercially available spin coater under the swing conditions of a rotational speed of 5,000 rpm and 10 seconds. Thereafter, the coating layer is annealed in an ambient atmosphere in an oven under the conditions of 145° C. ×2 hours. In this manner, a layer of the VDF/TrFE copolymer having a layer thickness of 0.1 $\mu$m is formed.

The insulating layer 12 need not necessarily be provided between the semiconductor layer 11 and the organic ferroelectric substance layer 13. However, the insulating layer 12 should preferably be provided because the problems with regard to carrier injection into the ferroelectric substance can be avoided. In cases where silicon is used as the semiconductor as in this embodiment, the insulating layer 12 should preferably be constituted of $SiO_2$, and its thickness should preferably be not larger than 100 nm.

Figure 2:
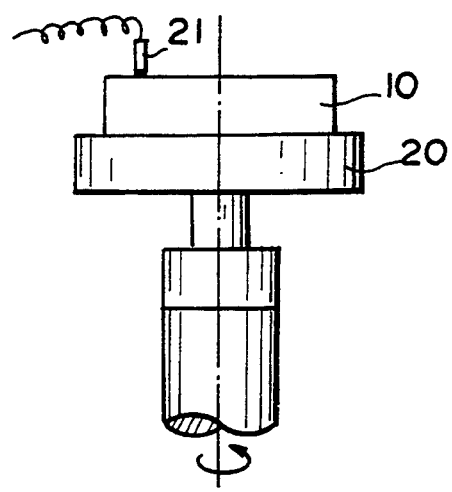
FIG. 2 is a schematic side view showing an apparatus for carrying out information recording and reproduction on the first embodiment.
Figure 3:
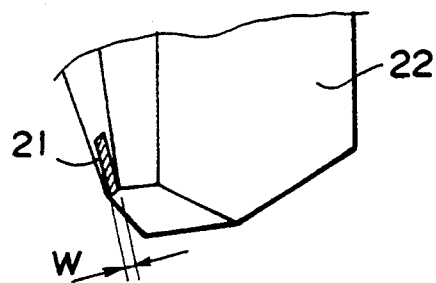
FIG. 3 is a perspective view showing a needle-like electrode employed in the apparatus of FIG. 2.

Results of information recording and reproducing experiments carried out on the information recording medium 10 will be described hereinbelow. In the experiments, as illustrated in FIG. 2, the information recording medium 10 was secured to a turn table 20 by an air chuck, or the like, and the turn table 20 served as one of electrodes for application of a voltage during the recording step. Also, as the other electrode for the application of the voltage, a movable needle-like electrode 21 was used. The needle-like electrode 21 was of the type disclosed in, for example, Japanese Unexamined Patent Publication No. 52(1977)-123205. As illustrated in FIG. 3, the needle-like electrode 21 was secured to the back of a supporting material 22, which was constituted of diamond, sapphire, or the like. The value of the width W of the needle-like electrode 21 depended on the recording track width, and was set at 1 $\mu$m in this embodiment. Also, the thickness of the needle-like electrode 21 was 0.5 $\mu$m.

The turn table 20 was rotated, and the needlelike electrode 21 was thereby caused to slide on the organic ferroelectric substance layer 13 of the information recording medium 10. In this state, the voltage was applied to the organic ferroelectric substance layer 13 across the needle-like electrode 21 and the turn table 20. As a result, the portion of the organic ferroelectric substance facing the needle-like electrode 21 was polarized in a predetermined direction. In this manner, the information could be recorded with the direction of the polarization. In this embodiment, for the purposes of evaluating the recording and reproducing performance of the information recording medium 10, the turn table 20 was rotated at 900 rpm, and positive and negative alternating pulses having a zero-to-peak amplitude of 20 V and a pulse width of 0.1 $\mu$s were applied across the needle-like electrode 21 and the turn table 20. In this manner, a pattern of polarization, in which the upward and downward directions of polarization were repeated alternately, was recorded on the organic ferroelectric substance layer 13. The recording tracks may be spiral or concentric.

How the recorded information was reproduced will be described hereinbelow. The same turn table 20 and the same needle-like electrode 21 as those used during the recording step were used. Also, as a pickup circuit connected to the needle-like electrode 21, a known electrostatic capacity pickup circuit conventionally used in the electrostatic capacity type of video disk system was employed. Specifically, when electric polarization was caused to occur in the organic ferroelectric substance layer 13 in the manner described above, as illustrated in FIG. 1, depletion layers 14, 14, . . . occurred at portions of the semiconductor layer 11 corresponding to the portions of the organic ferroelectric substance layer 13, at which the direction of polarization was downward towards the semiconductor layer 11. Therefore, the recorded information could be read out by detecting a change in the electrostatic capacity due to each depletion layer 14 by use of the pickup circuit.

In this embodiment, when an RF voltage of 4 V was applied across the needle-like electrode 21 and the turn table 20 from the pickup circuit and the turn table 20 was rotated at 900 rpm, a good reproduced signal having an amplitude of 1 mV was obtained. Also, when the information recorded at the same track was reproduced a plurality of times, it was confirmed that the recorded information was not lost.

The information recording medium in accordance with the present invention is also applicable to recording systems other than that described above. For example, the needle-like electrode 21 may be supported on a piezo-electric actuator, which is widely used to move a probe in a scanning tunnel microscope as disclosed in, for example, Japanese Unexamined Patent Publication No. 63(1988)-193349. Alternatively, the needle-like electrode 21 may fly pneumatically such that it may not in contact with the information recording medium 10 as in a magnetic disk drive unit, or the like, and quick scanning may thereby be carried out.

Figure 4:
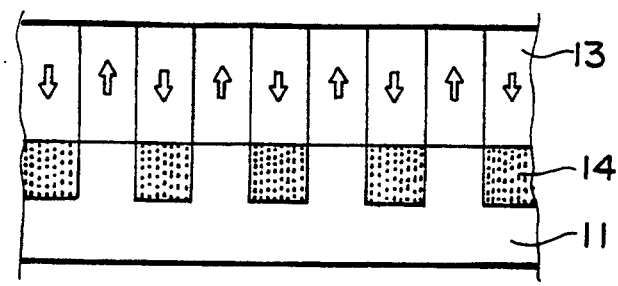
FIG. 4 is a schematic sectional side view showing a second embodiment of the information recording medium in accordance with the present invention.

A second embodiment of the information recording medium in accordance with the present invention will be described hereinbelow with reference to FIG. 4. In FIG. 4, similar elements are numbered with the same reference numerals with respect to FIG. 1. (This also applies to the drawings that follow.) An information recording medium 30 of the second embodiment comprises the semiconductor layer 11 and the organic ferroelectric substance layer 13, which is directly overlaid on the semiconductor layer 11. The aforesaid insulating layer 12 employed in the first embodiment is not provided in this embodiment.

Figure 5:
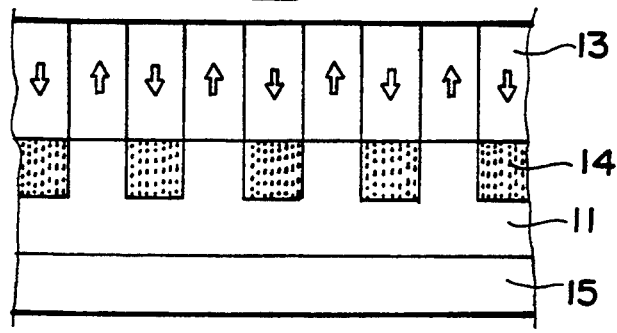
FIG. 5 is a schematic sectional side view showing a third embodiment of the information recording medium in accordance with the present invention.

A third embodiment of the information recording medium in accordance with the present invention will be described hereinbelow with reference to FIG. 5. An information recording medium 40 of the third embodiment comprises a substrate 15, the semiconductor layer 11 overlaid on the substrate 15, and the organic ferroelectric substance layer 13 overlaid on the semiconductor layer 11. The substrate 15 may be constituted of a polymer, glass, a metal, or the like. Also, the substrate 15 may be the so-called pre-formatted substrate, which has been provided with guide grooves or guide pits for tracking control, pits representing sector information, or the like.

During the formation of the organic ferroelectric substance layer 13, it is sufficient that the annealing temperature may ordinarily be approximately 100° C. Therefore, in cases where the substrate 15 serves as the pre-formatted substrate, the substrate 15 may be constituted of a polymer, with which the guide grooves, pits, and the like, can be formed easily and at a low cost by an injection molding process. On the other hand, in general, in cases where. an inorganic ferroelectric substance is used, an annealing temperature of not lower than 500° C. is necessary, and therefore a polymer cannot presently be used as the material for the substrate. Therefore, with the present invention, in cases where a pre-formatted substrate is used, its manufacturing cost can be kept lower than with the conventional technique.

<Comparative Example>.

For the purposes of confirming the effects of the information recording medium in accordance with the present invention, an information recording medium for comparison was prepared. The information recording medium of the comparative example was prepared by forming the semiconductor layer 11 and the insulating layer 12 in the same manner as that in the first embodiment and overlaying a layer of lead titanate on the insulating layer 12. Specifically, the information recording medium of the comparative example was different from the information recording medium of the first embodiment only in that lead titanate, which was one of inorganic ferroelectric substances, was used in lieu of the VDF/TrFE copolymer.

The layer of lead titanate was formed with a sputtering process. Specifically, a vacuum chamber was evacuated to at least $5 \times 10^{-7}$, and a mixed gas composed of 40% of oxygen and 40% of argon was introduced to a pressure of 10 mTorr into the vacuum chamber until the internal pressure reached 10 mTorr. Thereafter, an RF electric power of 500 W was applied to a $PbTiO_3$ target accommodated in the vacuum chamber, and the layer of lead titanate having a thickness of 0.1 μm was thereby formed. The silicon wafer, on which the layer of lead titanate had thud been overlaid, was taken out of the vacuum chamber, and annealed in an ambient atmosphere in an electric oven under the conditions of 600° C.×1 hour. In this manner, the information recording medium was obtained.

On the information recording medium of the comparative example, which had been prepared in the manner described above, information was recorded in the same manner as that in the first embodiment. Also, signal reproduction was carried out on the information recording medium of the comparative example in the same manner as that in the first embodiment. In this case, no reproduced signal was obtained. Specifically, it is considered that, with the information recording medium of the comparative example, the polarization which had occurred in the layer of lead titanate during the recording step was lost during the reproducing step.

An embodiment of the second information recording medium (i.e., a fourth embodiment) in accordance with the present invention will be described hereinbelow. In the second information recording medium in accordance with the present invention, the insulating layer is constituted of $SiO_2$, the ferroelectric substance layer is constituted of a vinylidene fluoride polymer or a copolymer containing vinylidene fluoride, and the thicknesses of the ferroelectric substance layer and the insulating layer are limited to the ranges described above.

Each of wafers, which had a diameter of 2 inches and were constituted of P-type silicon (p-Si) having a resistivity of 10 Ωcm and an impurity concentration of $5 \times 10^{21}$ m$^{-3}$, was supported in a radio-frequency magnetron sputtering apparatus. The surface of each of the wafers was then cleaned by etching with a reverse sputtering process under the conditions of a total gas pressure of 1 mTorr, a radio-frequency power of 100W, and a processing period of 1 minute.

Thereafter, each silicon wafer was kept in the sputtering apparatus, and an $SiO_2$ layer serving as an insulating layer was overlaid on the surface of the silicon wafer by using an $SiO_2$ target. During the formation of the insulating layer, insulating layers having seven different thicknesses of 15 nm, 20 nm, 25 nm, 30 nm, 35 nm, 40 nm, and 45 nm were formed by controlling the layer-forming sputtering period. A plurality of silicon wafers provided with the insulating layers were prepared for each of these seven thicknesses.

Thereafter, a solution containing a VDF/TrFE copolymer in methyl ethyl ketone (MEK) was applied onto each silicon wafer, on which the insulating layer of $SiO_2$ had been overlaid, by using a spin coater under the swing conditions of a rotational speed of 5,000 rpm and 10 seconds. The coating layer was then annealed under the conditions of 145° C.×2 hours. In this manner, an organic ferroelectric substance layer constituted of the VDF/TrFE copolymer was formed.

During the formation of the organic ferroelectric substance layer, solutions were used in which the concentrations of the VDF/TrFE copolymer were 3.0 wt %, 4.0 wt %, 5.0 wt %, 6.0 wt %, and 7.0 wt %. In this manner, ferroelectric substance layers having thicknesses of 0.1 μm, 0.2 μm, 0.3 μm, 0.4 μm, and 0.5 μm were formed. These five thicknesses of the ferroelectric substance layers were set for each of the seven different thicknesses of the insulating layers. Therefore, as a whole, samples corresponding to 35 combinations of the thicknesses of the ferroelectric substance layers and the insulating layers were obtained.

Figure 7:
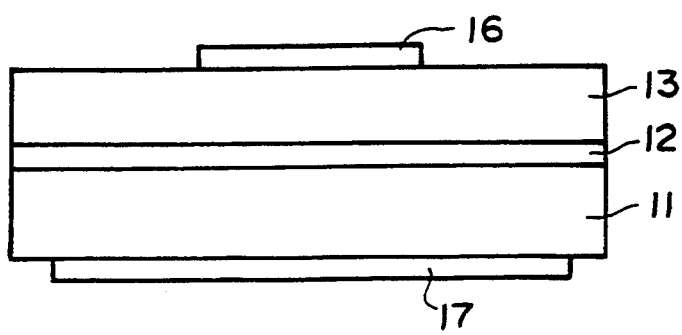
FIG. 7 is a schematic sectional side view showing a fourth embodiment of the information recording medium in accordance with the present invention.

A mask was then set on each of the samples, which had been obtained in the manner described above, and an aluminum (Al) electrode having a diameter of 0.5 mm and a thickness of 200 nm was formed on the ferroelectric substance layer by an electron beam deposition process. Also, an indium (In) electrode was formed on the side of the substrate such that they may be in an ohmic contact with each other. FIG. 7 is a schematic sectional side view showing the information recording medium, which has been prepared in the manner described above. In FIG. 7, reference numeral 11 represents the semiconductor layer constituted of p-Si, and reference numeral 12 represents the insulating layer constituted of $SiO_2$. Reference numeral 13 represents the ferroelectric substance layer constituted of the VDF/TrFE copolymer, reference numeral 16 represents the Al electrode, and reference numeral 17 represents the In electrode. In cases where the diameter of the Al electrode 16 is equal to 0.5 mm, if a change of 0.2 nF in the electrostatic capacity is obtained, the desirable degree of modulation of $\Delta C = 0.1$ μF/cm$^2$ can be obtained.

For each of the 35 kinds of the samples, which had been prepared in the manner described above, a probe was located such that it is in contact with the upper electrode (i.e., the Al electrode) 16, and the lower electrode (i.e., the In electrode) 17 was grounded. In such a state, the relationship between the applied voltage (i.e., a recording voltage Vw) and the electrostatic capacity was investigated by the steps described below under (1), (2), (3), and (4). (1) A voltage of +150V was applied to the probe for 1 second in order to true up the polarization of the ferroelectric substance layer 13. (2) A predetermined level of the recording voltage Vw was applied to the probe for 1 second. (3) The electrostatic capacity of the sample was determined at zero bias and 1 MHz by using an LCR meter. (4) The level of the recording voltage Vw in the step (2) was increased from 0 to −150V towards the minus side, and the steps (2) and (3) were repeated. In this manner, the relationship between the recording voltage Vw and the degree of modulation (i.e., the change in the electrostatic capacity) ΔC was investigated.

Figure 8:
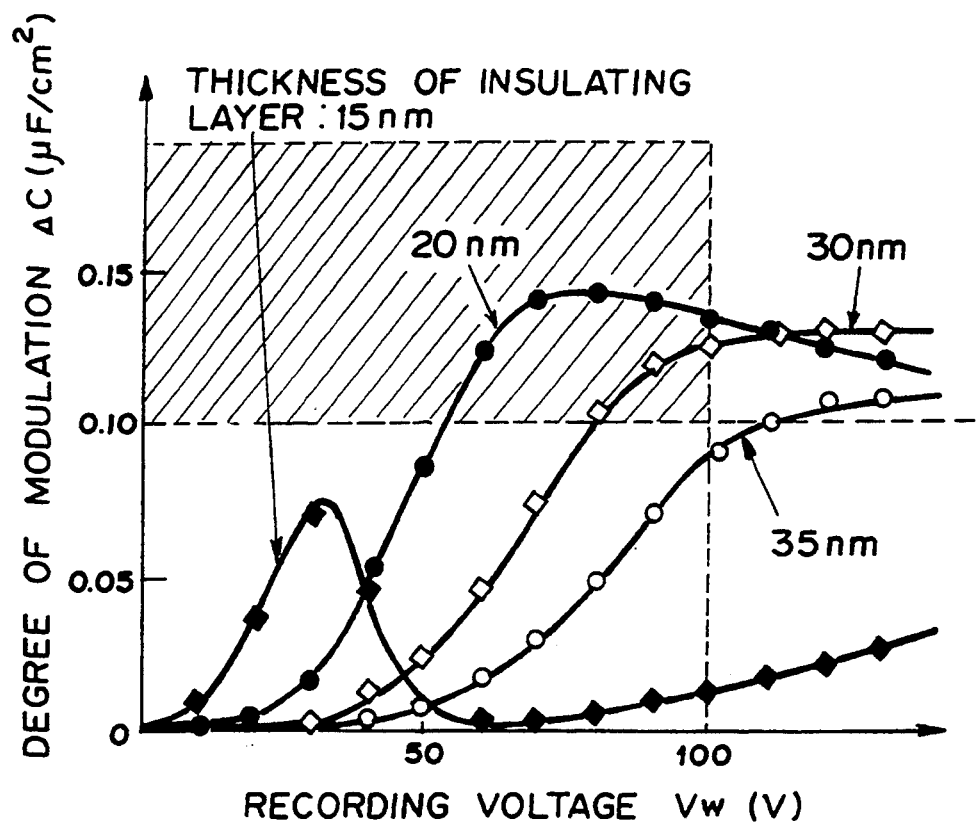
FIG. 8 is a graph showing the relationship among the thickness of an insulating layer, a recording voltage Vw, and a degree of modulation $\Delta C$ obtained from the information recording medium in accordance with the present invention.

FIG. 8 shows examples of the results of the measurements. The results of the measurements shown in FIG. 8 were obtained when the thickness of the ferroelectric substance layer 13 constituted of the VDF/TrFE copolymer was 0.3 μm. The region hatched in FIG. 8 represents the range wherein the recording voltage Vw is not higher than 100V and the degree of modulation ΔC is at least 0.1 μF/cm².

In general, the degree of modulation ΔC will increase as the recording voltage Vw becomes higher. However, as illustrated in FIG. 8, if the thickness of the insulating layer 12 constituted of SiO₂ is excessively small (15 nm in this case), the degree of modulation ΔC decreases as the recording voltage Vw becomes higher. This is presumably because, if the insulating layer 12 is excessively thin, carrier injection will occur through the insulating layer 12 into the ferroelectric substance layer 13, and the polarization of the ferroelectric substance will thereby be neutralized.

If the thickness of the insulating layer 12 constituted of SiO₂ is excessively large (35 nm in this case), the level of the voltage required for the recording step becomes high, and the saturated degree of modulation ΔC becomes low.

As described above, in cases where the insulating layer 12 is excessively thick or excessively thin, the relationship between the recording voltage Vw and the degree of modulation ΔC does not come into the region hatched in FIG. 8. The table below shows the results of judgments made as to whether various combinations of the thicknesses of the insulating layer 12 and the ferroelectric substance layer 13 are or are not appropriate.

TABLE 1

| Thickness of insulating layer | Thickness of ferroelectric layer (μm) | | | | |
|---|---|---|---|---|---|
| | 0.1 | 0.2 | 0.3 | 0.4 | 0.5 |
| 15 nm | X | X | X | X | Y |
| 20 nm | OK | OK | OK | OK | Y |
| 25 nm | OK | OK | OK | OK | Y |
| 30 nm | OK | OK | OK | Z | Y |
| 35 nm | OK | OK | Z | Z | Y |
| 40 nm | OK | Z | Z | Z | Y |
| 45 nm | Z | Z | Z | Z | Y |

In Table 1, the mark "X" represents that the degree of modulation ΔC attenuates due to carrier injection into the ferroelectric substance layer 13 before it increases as the recording voltage Vw becomes higher. The mark "Y" represents that the saturated degree of modulation ΔC does not reach 0.1 μF/cm². Also, the mark "Z" represents that a level of the recording voltage Vw higher than 100V is required. The mark "OK" represents that these three problems are not encountered.

Figure 6:
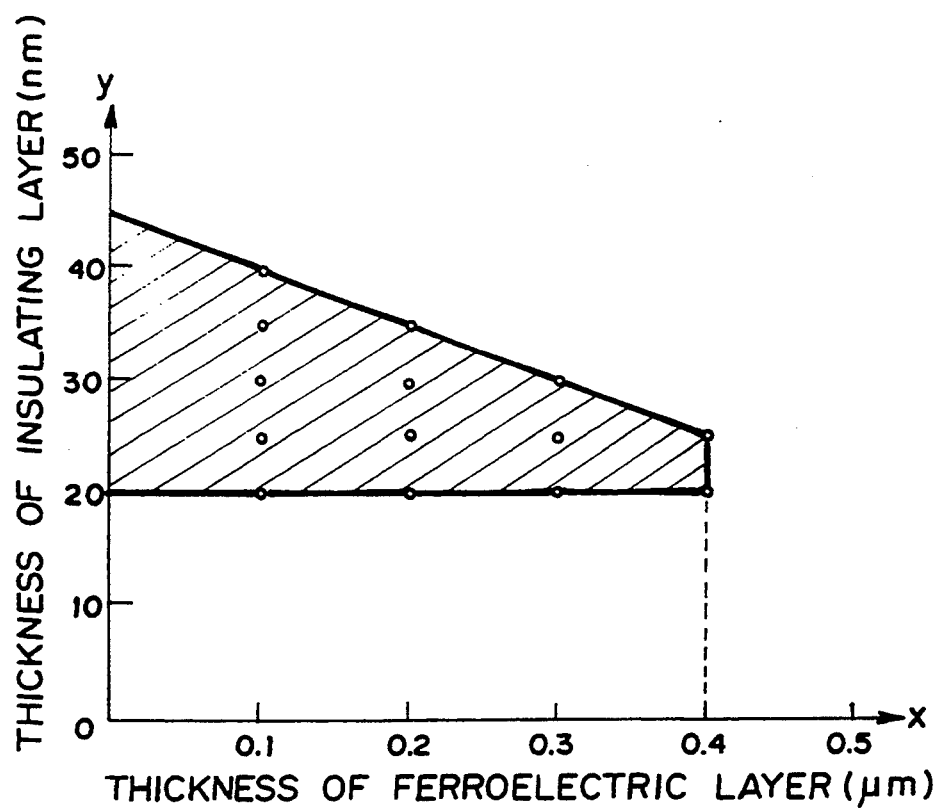
FIG. 6 is a graph showing preferable ranges of thicknesses of a ferroelectric substance layer and an insulating layer in the information recording medium in accordance with the present invention.

When the thickness x of the ferroelectric substance layer 13 is plotted on the horizontal axis of a coordinate system and the thickness y of the insulating layer 12 is plotted on the vertical axis of the coordinate system, the combinations of the thicknesses x and y, which are evaluated as "OK" fall within the region hatched in FIG. 6. Specifically, the region extends on the straight line, which connects the point having the coordinates (x=0.4 μm, y=25 nm) and the point having the coordinates (x=0.1 μm, y=40 nm), on the extension of the straight line, and under the straight line and the extension of the straight line. Also, the region satisfies the conditions $0 < x \leq 0.4$ μm and $y \geq 20$ nm. Therefore, in cases where the thicknesses of the layers 12 and 13 fall within this region, the conventional electroconductive head for the VHD system can directly be utilized to reproduce the recorded information. Also, the recording voltage can be kept at 100V or less, and therefore there is no risk that the information recording medium breaks.

In the embodiments described above, the ferroelectric substance layer 13 is constituted of the VDF/TrFE copolymer. Alternatively, the ferroelectric substance layer 13 may be constituted of the vinylidene fluoride polymer alone.

Proportions of vinylidene fluoride (VDF) desirable when the organic ferroelectric substance layer is constituted of a VDF/TrFE copolymer were investigated from the point of view of the recording speed. The results of the investigation will be described hereinbelow. With the aforesaid first embodiment of the information recording medium in accordance with the present invention and with the other embodiments described above, it has been confirmed that the information recording medium comprising the semiconductor layer 11 and the organic ferroelectric substance layer 13, which is overlaid on the semiconductor layer 11 and which is constituted of a VDF/TrFE copolymer, can be used for the information recording and reproduction. Therefore, in this case, for the purposes of evaluating the speed, with which the polarization of the VDF/TrFE copolymer itself is reversed, the semiconductor layer was not provided, and VDF/TrFE copolymers serving as the organic ferroelectric substance layers were overlaid directly on aluminum (Al) substrates. In this manner, rating samples were prepared.

<First rating sample>

Figure 9:
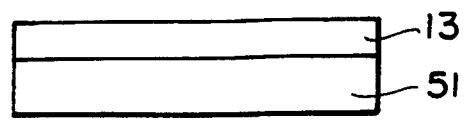
FIG. 9 is a schematic sectional side view showing a rating sample used during the evaluation of the effects of the present invention.

First, a VDF/TrFE copolymer, which contained VDF in a proportion of 52 mol %, was dissolved in a proportion of 10 wt % in methyl ethyl ketone (MEK). The resulting solution was then applied onto an Al substrate by using a commercially available spin coater under the swing conditions of a rotational speed of 5,000 rpm and 10 seconds. Thereafter, the coating layer was annealed in an ambient atmosphere in an oven under the conditions of 145° C.×2 hours. In this manner, an organic ferroelectric substance layer constituted of a thin layer of the VDF/TrFE copolymer having a layer thickness of 1 μm was formed. A first rating sample was thereby prepared. FIG. 9 is a schematic sectional side view showing the first rating sample 50. In FIG. 9, reference numeral 51 represents the Al substrate, and reference numeral 13 represents the organic ferroelectric substance layer.

Figure 10:
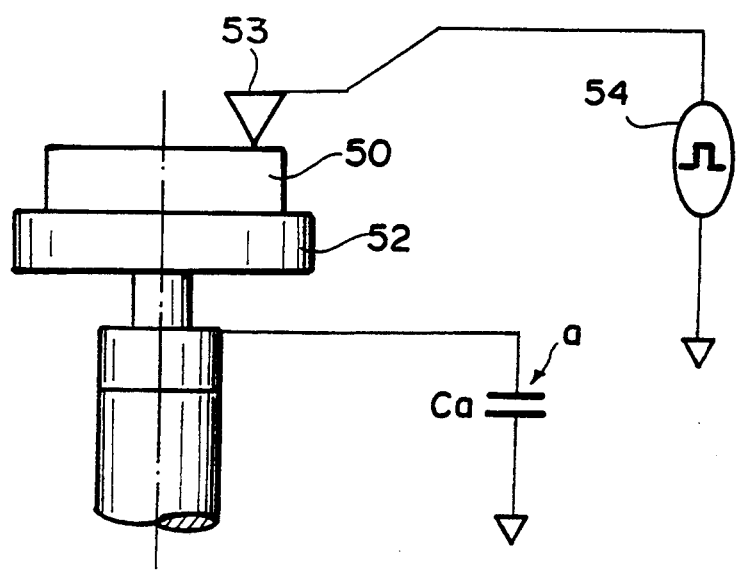
FIG. 10 is a schematic side view showing an apparatus for carrying out information recording on the rating sample of FIG. 9.

The first rating sample 50 was set on a recording apparatus shown in FIG. 10, and the speed, with which the polarization of the VDF/TrFE copolymer is inverted, was determined. In the apparatus shown in FIG. 10, the first rating sample 50 was secured to a sample support 52 by an air chuck, or the like. Also, in FIG. 10, reference numeral 53 represents a movable needle-like electrode, which is constituted of tungsten and has a bottom surface diameter of, for example, 50 μm. Reference numeral 54 represents an electric pulse source for applying a pulsed voltage across the organic ferroelectric substance layer 13 via the needle-like electrode 53 and the sample support 52. In this example, as illustrated in FIG. 11, a negative initializing pulse having a pulse width of 100 ms was applied across the organic ferroelectric substance layer 13. Thereafter, a positive recording pulse having a pulse width of 10 ms was applied thereto. A change in electric charges Va, which accumulated in a capacitor Ca shown in FIG. 10 when the recording pulse was applied, was investigated. The polarization inversion time was defined as the time required before the electric charges Va reached 90% of their saturation value. For the first rating sample 50, the polarization inversion time was $2 \times 10^{-8}$ second.

<Second rating sample>

A second rating sample was prepared in the same manner as that in the first rating sample, except that the organic ferroelectric substance layer 13 was constituted of a VDF/TrFE copolymer containing VDF in a proportion of 65 mol %. For the second rating sample, the polarization inversion time of the organic ferroelectric substance layer 13 was determined in the same manner as that described above. In this case, the polarization inversion time was $1 \times 10^{-7}$ second.

<Third rating sample>

A third rating sample was prepared in the same manner as that in the first rating sample, except that the organic ferroelectric substance layer 13 was constituted of a VDF/TrFE copolymer containing VDF in a proportion of 75 mol %. For the third rating sample, the polarization inversion time of the organic ferroelectric substance layer 13 was determined in the same manner as that described above. In this case, the polarization inversion time was $1 \times 10^{-6}$ second.

Table 2 shows the results of the determination.

TABLE 2

|  | Proportion of VDF (mol %) | Inversion time (s) |
| --- | --- | --- |
| First rating sample | 52 | $2 \times 10^{-8}$ |
| Second rating sample | 65 | $1 \times 10^{-7}$ |
| Third rating sample | 75 | $1 \times 10^{-6}$ |

The polarization inversion time of the organic ferroelectric substance layer is equivalent to the recording time. Information can be recorded more quickly as the polarization inversion time is shorter. As for information recording media, on which various kinds of information, such as image signals and audio signals, are recorded or which are used as information memories for computers, sufficiently quick information recording can be effected if the recording time is nor longer than approximately $1 \times 10^{-7}$ second. Therefore, in cases where the organic ferroelectric substance layer is constituted of a VDF/TrFE copolymer, if a VDF/TrFE copolymer containing VDF in proportions of not higher than 65 mol % is used, an information recording medium on which the information can be recorded sufficiently quickly can be obtained. However, if the proportions of VDF in the VDF/TrFE copolymer are lower than 50 mol %, the problems will occur in that the VDF/TrFE copolymer cannot exhibit the ferroelectric properties. Therefore, in the present invention, in cases where an information recording medium on which the information can be recorded quickly is to be obtained, the lower limit of the proportions of VDF should be 50 mol %.

Proportions of vinylidene fluoride (VDF) desirable when the organic ferroelectric substance layer is constituted of a VDF/TrFE copolymer were investigated from the point of view of the resistance to ambient temperatures. The results of the investigation will be described hereinbelow. In this case, for the purposes of evaluating the D-E loop (i.e., the hysteresis loop) of the VDF/TrFE copolymer itself, the semiconductor layer was not provided, and VDF/TrFE copolymers serving as the organic ferroelectric substance layers were overlaid directly on aluminum (Al) substrates. In this manner, rating samples were prepared.

<Fourth rating sample>

Figure 12:
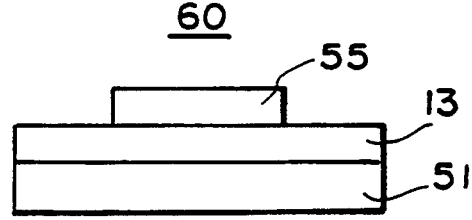
FIG. 12 is a schematic sectional side view showing a different rating sample used during the evaluation of the effects of the present invention.

First, a VDF/TrFE copolymer, which contained VDF in a proportion of 75 mol %, was dissolved in a proportion of 10 wt % in methyl ethyl ketone (MEK). The resulting solution was then applied onto an Al substrate by using a commercially available spin coater under the swing conditions of a rotational speed of 5,000 rpm and 10 seconds. Thereafter, the coating layer was annealed in an ambient atmosphere in an oven under the conditions of 145° C.×2 hours. In this manner, an organic ferroelectric substance layer constituted of a thin layer of the VDF/TrFE copolymer having a layer thickness of 1 μm was formed. Thereafter, an upper electrode constituted of Al and having a diameter of, for example, 0.5 mm and a thickness of, for example, 100 nm was formed on the organic ferroelectric substance layer by a vacuum evaporation process. A fourth rating sample was thereby prepared. FIG. 12 is a schematic sectional side view showing the fourth rating sample 60. In FIG. 12, reference numeral 51 represents the Al substrate, reference numeral 13 represents the organic ferroelectric substance layer, and reference numeral 55 represents the upper electrode.

Figure 13:
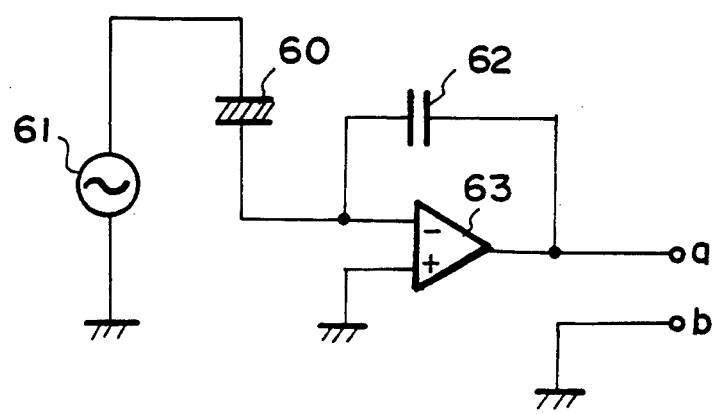
FIG. 13 is a circuit diagram showing the apparatus for determining a D-E loop of the rating sample shown in FIG. 12.

For the purposes of determining the Curie temperature of the organic ferroelectric substance layer 13 of the fourth rating sample 60, the fourth rating sample 60 was set on a measuring apparatus shown in FIG. 13, and the D-E loop of the fourth rating sample 60 was determined. In FIG. 13, reference numeral 61 represents an AC electric power source for generating a 50 Hz sine wave current, reference numeral 62 represents an integration capacitor, and reference numeral 63 represents an amplifier. The intensity E of the electric field applied to the organic ferroelectric substance layer 13 is calculated with the formula $E=V/d$, wherein V represents the voltage applied across the organic ferroelectric substance layer 13, and d represents the thickness of the organic ferroelectric substance layer 13. Also, the dielectric flux density D can be calculated by determining the voltage Vab across terminals a and b and using the formula $D=Vab\cdot C/A$, wherein C represents the capacitance of the integration capacitor 62, and A represents the electrode area in the fourth rating sample 60.

The determination of the D-E loop was carried out each time the temperature of the fourth rating sample 60 was increased by a predetermined value, and the residual polarization Pr was determined in each case. Also, the temperature at which the residual polarization Pr disappeared was taken as the Curie temperature. The Curie temperature of the fourth rating sample 60 was 110° C.

<Fifth rating sample>

A fifth rating sample was prepared in the same manner as that in the fourth rating sample, except that the organic ferroelectric substance layer 13 was constituted of a VDF/TrFE copolymer containing VDF in a proportion of 65 mol %. For the fifth rating sample, the Curie temperature was determined in the same manner as that described above. In this case, the Curie temperature was 90° C.

<Sixth rating sample>

A sixth rating sample was prepared in the same manner as that in the fourth rating sample, except that the organic ferroelectric substance layer 13 was constituted of a VDF/TrFE copolymer containing VDF in a proportion of 52 mol %. For the sixth rating sample, the Curie temperature was determined in the same manner as that described above. In this case, the Curie temperature was 65° C.

<Seventh rating sample>

A seventh rating sample was prepared in the same manner as that in the fourth rating sample, except that the organic ferroelectric substance layer 13 was constituted of a VDF/TrFE copolymer containing VDF in a proportion of 82 mol %. For the seventh rating sample, the Curie temperature was determined in the same manner as that described above. In this case, no hysteresis was obtained in the D-E relationship, and it was clear that the seventh rating sample could not be used as an information recording medium.

<eighth rating sample>

Figure 14:
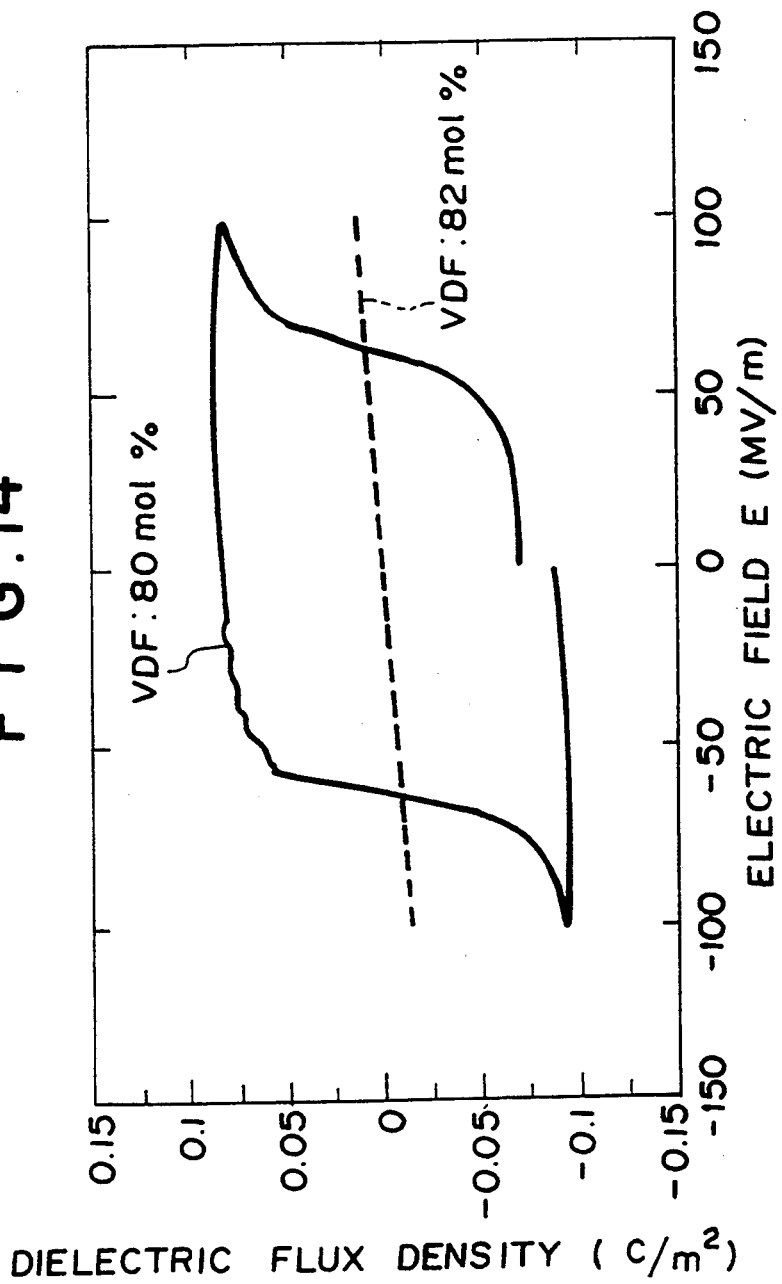
FIG. 14 is a graph showing an example of a D-E loop of a VDF/TrFE copolymer.

In view of the determination results obtained with the seventh rating sample, an eighth rating sample was prepared in which the proportion of VDF was 80 mol %. The eighth rating sample was identical with the fourth rating sample, except for the proportion of VDF. As illustrated in FIG. 14, as for the eighth rating sample, a hysteresis was obtained in the D-E relationship, and the Curie temperature was 125° C. FIG. 14 also shows the determination results obtained with the seventh rating sample described above, in which no hysteresis was obtained.

Table 3 shows the results of the determination. FIG. 15 shows the relationship between the proportions of VDF and the Curie temperature.

TABLE 3

| | Proportion of VDF (mol %) | Curie temp. (°C.) | Remarks |
|---|---|---|---|
| Fourth rating sample | 75 | 110 | |
| Fifth rating sample | 65 | 90 | |
| Sixth rating sample | 52 | 65 | |
| Seventh rating sample | 82 | — | No hysteresis was obtained. |

As described above, the Curie temperature of the VDF/TrFE copolymer varies for different proportions of VDF in the copolymer. If the information recording medium having the ferroelectric substance layer constituted of the VDF/TrFE copolymer is exposed to ambient temperatures higher than the Curie temperature, the spontaneous polarization of the ferroelectric substance layer will be lost, and the information recorded on the information recording medium will disappear. For example, during the temperature test specified in JIS C 0021, which is one of typical test methods for electronic materials, samples are often heated at 85° C. Therefore, such that the information recording medium in accordance with the present invention may be formed as a valuable medium capable of being used widely, it is desired for the Curie temperature of the ferroelectric substance layer to be not lower than 85° C.

Therefore, in cases where the resistance of the information recording medium, which has the ferroelectric substance layer constituted of the VDF/TrFE copolymer, to the ambient temperature is to be kept high from the point of view of the proportions of VDF, the Curie temperature should preferably be not lower than 90° C. (with a margin of 5° C. being added to 85° C). Therefore, the lower limit of the proportions of VDF should preferably be 65 mol %. Also, as described above, if the proportion of VDF is 80 mol %, a hysteresis can be obtained in the D-E relationship. If the proportion of VDF is higher than 80 mol %, there is the risk that no hysteresis can be obtained in the D-E relationship. Accordingly, the upper limit of the proportions of VDF should preferably be 80 mol %.

A fifth embodiment of the information recording medium in accordance with the present invention will be described hereinbelow. In the fifth embodiment, no insulating layer is provided between the semiconductor layer and the ferroelectric substance layer such that the semiconductor layer and the ferroelectric substance layer may be in direct contact with each other.

A solution containing a VDF/TrFE copolymer in methyl ethyl ketone (MEK) was applied onto each of wafers, which had a diameter of 2 inches and were constituted of P-type silicon (p-Si) having a resistivity of 10 $\Omega$cm and an impurity concentration of $5 \times 10^{21}$ $m^{-3}$. The application of the solution was carried out by using a spin coater under the swing conditions of a rotational speed of 5,000 rpm and 10 seconds. The coating layer was then annealed under the conditions of 145° C.$\times$2 hours. In this manner, an organic ferroelectric substance layer constituted of the VDF/TrFE copolymer was formed.

During the formation of the organic ferroelectric substance layer, solutions were used in which the concentrations of the VDF/TrFE copolymer were 4.0 wt %, 5.0 wt %, 6.0 wt %, and 7.0 wt %. In this manner, ferroelectric substance layers having thicknesses of 0.2 $\mu$m, 0.3 $\mu$m, 0.4 $\mu$m, and 0.5 $\mu$m were formed.

Figure 16:
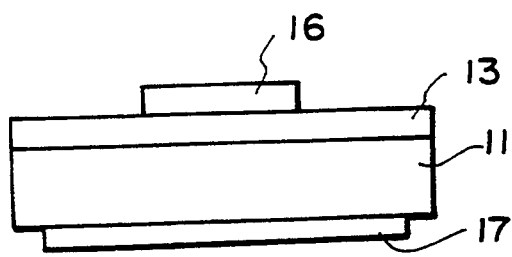
FIG. 16 is a schematic sectional side view showing a fifth embodiment of the information recording medium in accordance with the present invention.

A mask was then set on each of the samples, which had been obtained in the manner described above, and an aluminum (Al) electrode having a diameter of 0.5 mm and a thickness of 200 nm was formed on the ferroelectric substance layer by an electron beam deposition process. Also, an indium (In) electrode was formed on the side of the substrate such that they may be in an ohmic contact with each other. FIG. 16 is a schematic sectional side view showing the information recording medium, which has been prepared in the manner described above. In FIG. 16, reference numeral 11 represents the semiconductor layer constituted of p-Si, and reference numeral 13 represents the ferroelectric substance layer constituted of the VDF/TrFE copolymer. Also, reference numeral 16 represents the Al electrode, and reference numeral 17 represents the In electrode.

<Comparative example>

For comparison, information recording media having an insulating layer intervening between a semiconductor layer and a ferroelectric substance layer were prepared in the manner described below. Specifically, each of wafers, which had a diameter of 2 inches and were constituted of P-type silicon (p-Si) having a resistivity of 10 $\Omega$cm and an impurity concentration of $5 \times 10^{21}$ $m^{-3}$, was supported in a radio-frequency magnetron sputtering apparatus. The surface of each of the wafers was then cleaned by etching with a reverse sputtering process under the conditions of a total gas pressure of 1 mTorr, a radio-frequency power of 100W, and a processing period of 1 minute.

Thereafter, each silicon wafer was kept in the sputtering apparatus, and an $SiO_2$ layer serving as an insulating layer was overlaid on the surface of the silicon wafer by using an $SiO_2$ target. During the formation of the insulating layer, the sputtering conditions were such that the total gas pressure was 1 mTorr, the ratio of oxygen to argon in the vacuum chamber was 10%, the $SiO_2$ target size was 4 inches, the radio-frequency power was 400W, and the substrate temperature was 350° C. Also, the thickness of the $SiO_2$ layer was set at 20 nm by controlling the layer-forming sputtering period.

Thereafter, in the same manner as that in the fifth embodiment, an organic ferroelectric substance layer constituted of a VDF/TrFE copolymer was formed on each silicon wafer, on which the insulating layer of SiO$_2$ had been overlaid. In this case, ferroelectric substance layers having thicknesses of 0.2 μm, 0.3 μm, 0.4 μm, and 0.5 μm were formed. Also, in the same manner as that in the fifth embodiment, an Al electrode and an In electrode were formed. The schematic sectional side view of each of the information recording media obtained with the comparative example in the manner described above is identical with that shown in FIG. 7.

For each of the eight kinds of the samples, which had been prepared in the manner described above, a probe was located such that it is in contact with the upper electrode (i.e., the Al electrode) 16, and the lower electrode (i.e., the In electrode) 17 was grounded. In such a state, the relationship between the applied voltage (i.e., a recording voltage Vw) and the electrostatic capacity was investigated by the steps described below under (1), (2), (3), and (4).

(1) A voltage of +150V was applied to the probe for 1 second in order to true up the polarization of the ferroelectric substance layer.
(2) A predetermined level of the recording voltage Vw was applied to the probe for 1 second.
(3) The electrostatic capacity of the sample with a 1 MHz alternating current was determined at zero bias by using an LCR meter.
(4) The level of the recording voltage Vw in the step (2) was increased towards the minus side, and the steps (2) and (3) were repeated. In this manner, the relationship between the recording voltage Vw and the degree of modulation (i.e., the change in the electrostatic capacity) ΔC was investigated.

Figure 17:
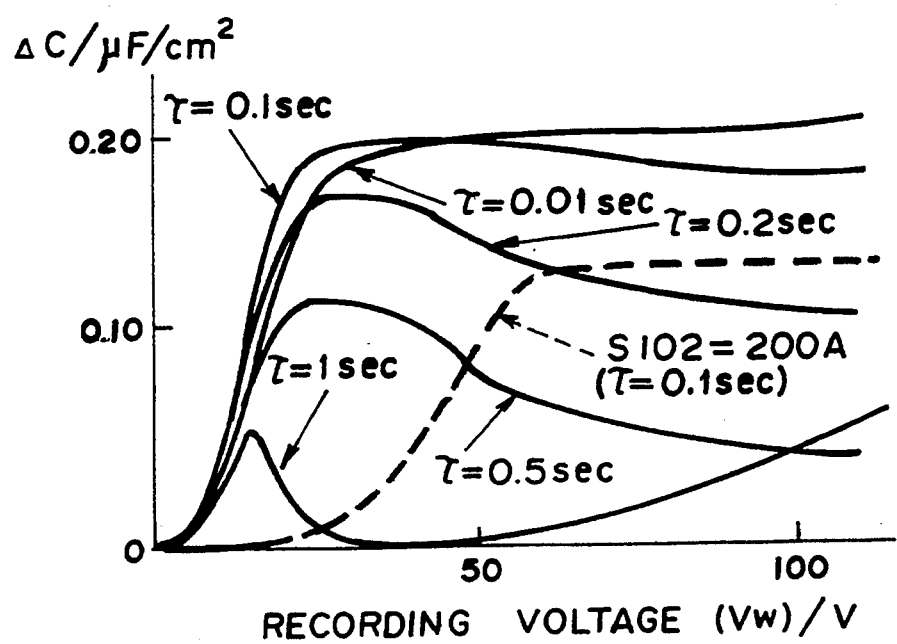
FIG. 17 is a graph showing the relationship among the recording voltage application time $\tau$, a recording voltage Vw, and a degree of modulation $\Delta C$ obtained from the fifth embodiment of the information recording medium in accordance with the present invention.

Further, the time, for which the recording voltage Vw in the step (2), was changed to 0.5 second, 0.2 second, 0.1 second, and 0.01 second, and the determination was carried out in the same manner. FIG. 17 shows examples of the results of the determination. The results of the determination shown in FIG. 17 were obtained when the thickness of the ferroelectric substance layer 13 constituted of the VDF/TrFE copolymer was 0.2 μm. As for the samples having no insulating layer (no SiO$_2$ layer), the results obtained when the recording voltage application time τ was 1 second, 0.5 second, 0.2 second, 0.1 second, and 0.01 second are shown. As for the samples of the comparative example having the insulating layer (the SiO$_2$ layer), the results obtained when the recording voltage application time τ was 0.1 second are shown.

Table 4 shows the maximum value ΔCmax of the degree of modulation ΔC and the level of the voltage required for the recording when τ=0.1 second. The voltage required for the recording was determined in terms of the voltage required for the degree of modulation ΔC to reach 90% of the maximum value ΔCmax.

TABLE 4

| VDF/TrFE film thickness (μm) | ΔCmax(μF/cm$^2$) | | Voltage required for the recording (v) | |
|---|---|---|---|---|
| | No insulating layer provided | Insulating layer provided | No insulating layer provided | Insulating layer provided |
| 0.2 | 0.20 | 0.13 | 20 | 55 |
| 0.3 | 0.18 | 0.12 | 35 | 70 |
| 0.4 | 0.16 | 0.11 | 45 | 95 |
| 0.5 | 0.14 | 0.10 | 55 | 105 |

As described above, in cases where the organic ferroelectric substance layer 13 is constituted of the VDF/TrFE copolymer, if an insulating layer which is thick to some extent is not provided between the semiconductor layer 11 and the organic ferroelectric substance layer 13, it often occurs that carrier injection into the organic ferroelectric substance layer 13 occurs. However, it was found that, as illustrated in FIG. 17, even if no insulating layer is provided, in cases where the recording voltage application time τ is as short as 0.1 second or less, a higher degree of modulation ΔC can be obtained than when the insulating layer constituted of SiO$_2$ is provided. This will presumably because, in cases where the recording voltage application time τ is as short as the specified period of time, the effects of the carrier injection into the organic ferroelectric substance layer 13 disappear. On the other hand, if the recording voltage application time τ is as long as 1 second in cases where no insulating layer is provided, the degree of modulation ΔC will readily show a peak and will thereafter becomes low.

Also, when the recording voltage application time τ is decreased little by little, the degree of modulation ΔC becomes high. The degree of modulation ΔC reaches its maximum when τ=0.1 second. Even if the recording voltage application time τ is shortened even further, the degree of modulation ΔC does not increase any more. Therefore, in the present invention, in cases where no insulating layer is provided and carrier injection is prevented by shortening the recording voltage application time τ, the maximum value of τ should preferably be 0.1 second.

As shown in Table 4, in cases where no insulating layer is provided and the time τ is 0.1 second, preferable results can be obtained in that the value of ΔCmax, i.e., the reproducing output power, becomes higher than when an insulating layer is provided. Also, the voltage required for the recording becomes lower than when an insulating layer is provided. In such cases, the value of ΔCmax becomes larger and the voltage required for the recording becomes lower as the organic ferroelectric substance layer 13 is thinner.

Further, as is clear from FIG. 17, the time τ should more preferably be 0.01 second because the effects of carrier injection can be restricted even further and the tolerance of the recording voltage becomes wide.

What is claimed is:

1. An information recording medium comprising a semiconductor layer and a layer of a ferroelectric substance overlaid on the semiconductor layer, information being recorded by means of directions of polarization of the ferroelectric substance, wherein the ferroelectric substance is an organic ferroelectric substance.

2. An information recording medium as defined in claim 1 wherein an insulating layer constituted of SiO$_2$ intervenes between the semiconductor layer and the ferroelectric substance layer, the ferroelectric substance layer is constituted of a material selected from the group consisting of a vinylidene fluoride polymer and a copolymer containing vinylidene fluoride, and a thickness x of the ferroelectric substance layer and a thickness y of the insulating layer fall within a region on a coordinate system, in which the thickness x is plotted on a horizontal axis and the thickness y is plotted on a vertical axis, the region extending on a straight line, which connects a point having coordinates ($x=0.4$ $\mu$m, $y=25$ nm) and a point having coordinates ($x=0.1$ $\mu$m, $y=40$ nm), on an extension of the straight line, and under the straight line and the extension of the straight line, and satisfying the conditions $0<x\leq 0.4$ $\mu$m and $y\geq 20$ nm.

3. An information recording medium as defined in claim 2, wherein said medium is further characterized in that said ferroelectric substance layer is polarized at a recording voltage less than about 100 Volts.

4. An information recording medium as defined in claim 1 wherein the ferroelectric substance layer is constituted of a vinylidene fluoride-trifluoro ethylene copolymer, in which the proportion of vinylidene fluoride falls within the range of 50 to 65 mol %.

5. An information recording medium as defined in claim 1 wherein the ferroelectric substance layer is constituted of a vinylidene fluoride-trifluoro ethylene copolymer, in which the proportion of vinylidene fluoride falls within the range of 65 to 80 mol %.

6. An information recording medium as defined in claim 1 wherein the ferroelectric substance layer is constituted of a material selected from the group consisting of a vinylidene fluoride polymer and a copolymer containing vinylidene fluoride, and the semiconductor layer and the ferroelectric substance layer are in direct contact with each other without any insulating layer intervening therebetween.

7. An information recording medium as defined in claim 1, wherein said medium is further characterized in that said ferroelectric substance layer is locally polarized by a recording voltage having a duration of less than about 0.1 second.

* * * * *